W. A. ROGERS,

Assignor by mesne assignments to J. HENDY.

DEVICE FOR RAISING TAILINGS FROM MINES.

No. 9,885. Reissued Sept. 27, 1881.

Witnesses:
W. Voit
W. P. Clark

Inventor:
Wilford A. Rogers,
By his Attys. Bonn & Colam
F. C. Jones, Associate

N. PETERS, Photo-Lithographer, Washington, D. C.

UNITED STATES PATENT OFFICE.

WILFORD A. ROGERS, OF FOLSOM, ASSIGNOR, BY MESNE ASSIGNMENTS, TO JOSHUA HENDY, OF SAN FRANCISCO, CALIFORNIA.

DEVICE FOR RAISING TAILINGS FROM MINES.

SPECIFICATION forming part of Reissued Letters Patent No. 9,885, dated September 27, 1881.

Original No. 122,657, dated January 9, 1872. Application for reissue filed May 14, 1881.

*To all whom it may concern:*

Be it known that I, WILFORD A. ROGERS, of Folsom, county of Sacramento, State of California, have invented Improvements in Raising Tailings from Mines; and I do hereby declare the following description and accompanying drawings are sufficient to enable any person skilled in the art or science to which it most nearly appertains to make and use my said invention or improvements without further invention or experiment.

My invention relates to an improved apparatus for raising tailings and dirt from bed-rock diggings up to and above the surface of the ground, for the purpose of keeping the diggings clear of obstructions and getting rid of the débris or tailings. It is frequently the case in placer mines that the pay dirt lies upon or near the bed-rock at a depth of ten or twelve feet from the surface of the ground, which necessitates the removal of the top dirt before the pay dirt can be reached, thus compelling the work of mining to be done below the surface. In this case the accumulation of the dirt and tailings soon causes serious inconvenience, which my invention is intended to obviate by providing a means of removing them from the mine.

In order to give a full and clear understanding of my invention, reference is had to the accompanying drawings, forming a part of this specification, in which—

Figure 1:
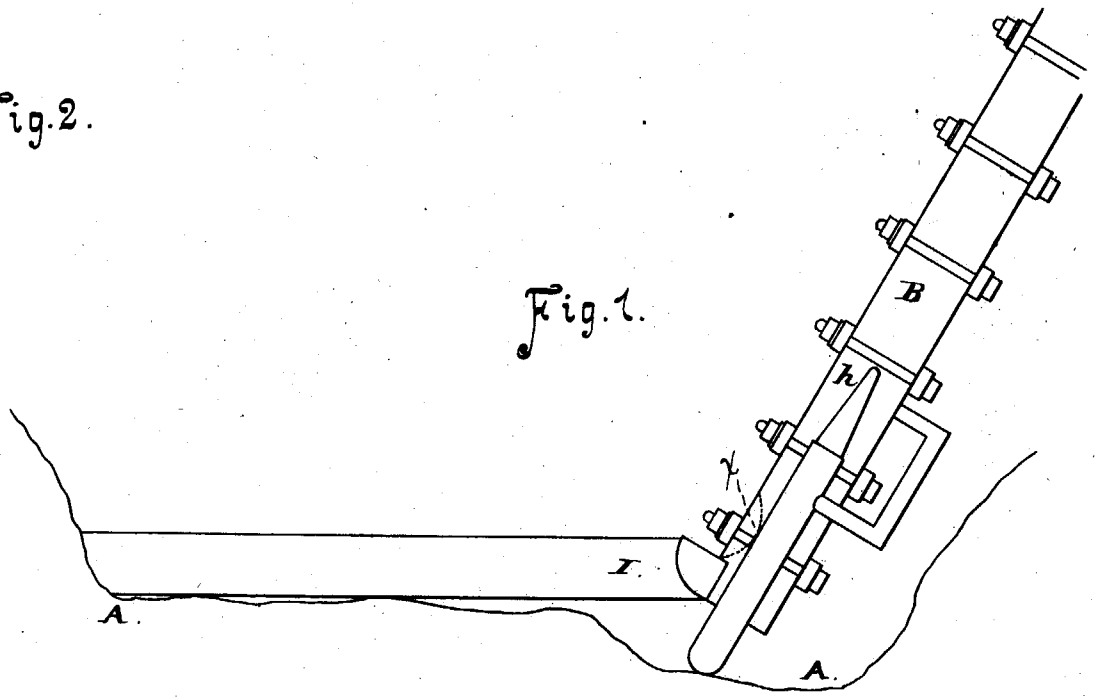
Figure 2:
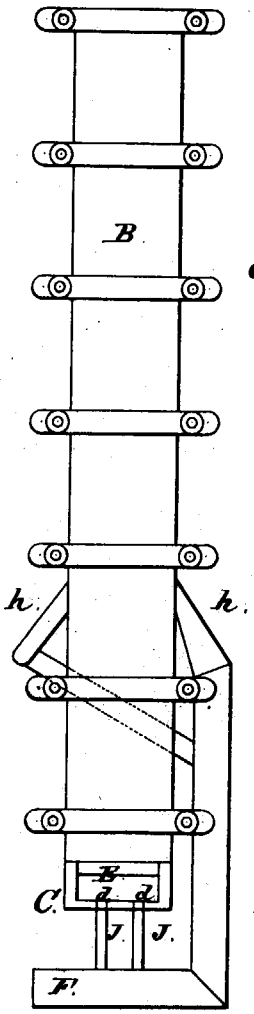

Figure 1 is a side elevation of my apparatus. Fig. 2 is a plan view.

A represents a pit, formed by excavation in order to reach pay dirt upon or near the bed-rock. In order to remove dirt and tailings from this pit or excavation, I employ a spout-pipe or closed flume, B, which is capable of withstanding the necessary inside pressure, and place it at an angle so that its lower end will rest upon the bed-rock or bottom of the excavation, while its upper end extends above and is supported by the bank. The lower end of this flume is closed by an end piece, C, in which are two or more holes, *d*. At one side, near the lower end of this flume, is an opening, E, with or into which the sluice or tail-race I from the diggings communicates, so as to carry the dirt or tailings from the sluices into the lower end of the closed flume B. Now, in order to raise this dirt or tailings through the flume to the surface from some elevated position, so as to produce a proper head, I lead water into the pipe F, thence through the hose J J into the lower end of the flume, so that the streams will be delivered into and through it in a direct line with its length. Just above the opening E, and on the inside of the flume, the passage through it is contracted at *x*, as shown by the dotted lines, Fig. 1, so that the streams from the nozzle will pass through the contracted opening. Thus when the sluice has delivered the dirt and tailings in the lower end of the closed flume it will be caught by the upward-passing stream and carried up the flume and discharged upon the bank at the surface.

In case the force of the streams which are delivered through the holes *d* should not be sufficient to carry the débris to the surface, other nozzles, *h*, can be applied through holes in the sides of the flume at intervals toward the upper end, so as to give additional impulse to the tailings in the shaft.

This same device can also be used for conveying tailings upon a level or at any inclination where a sufficient fall of water cannot be obtained to carry them off.

Having thus described my invention, what I claim as new, and desire to secure by Letters Patent, is—

1. The spout or closed flume B, with its end piece, C, provided with holes *d*, in combination with the opening E, substantially as described.

2. A discharging flume or pipe having combined with it the inflow-pipes *h* J J, the pipes J J being arranged so as to direct the currents in line with the said flume or pipe, substantially as described.

3. Pipe F, having one or more branches which are arranged above the lower end of the pipe B, in combination with the direct inflow pipes or hose J, substantially as described.

4. The spout or closed flume B, with its end piece, C, provided with holes *d* and the opening E, in combination with the flume I, substantially as described.

5. The improved method of mining in dry excavations, the same consisting in conveying the tailings and the dirt by a sluice or tail-race from the dry diggings to and into the lower end of the flume, and raising the tailings and dirt through said flume to the top of the bank by means of a stream of water injected into said flume, substantially as described.

6. The combination, with the flume, of a ground-sluice or tail-race and an injecting-pipe, substantially as and for the purpose described.

7. The combination of the flume, the ground-sluice, and an injecting-pipe, the discharging end of said sluice being arranged above the injecting-pipe, substantially as described.

In witness whereof I have hereunto set my hand and seal.

WILFORD ALFORD ROGERS. [L. S.]

Attest:
W. F. CLARK,
J. L. BOONE.